United States Patent [19]

Chambrette et al.

[11] Patent Number: 4,810,480
[45] Date of Patent: Mar. 7, 1989

[54] PREPARATION OF POLYCHLOROPHOSPHAZENE

[75] Inventors: Jean-Paul Chambrette, Billere; Roger de Jaeger, Chereng; Philippe Potin, Billere, all of France

[73] Assignee: Atochem, Puteaux, France

[21] Appl. No.: 166,369

[22] Filed: Mar. 10, 1988

[30] Foreign Application Priority Data

Mar. 10, 1987 [FR] France ............... 87 03252

[51] Int. Cl.4 .................................... C01B 25/10
[52] U.S. Cl. ........................................ 423/300
[58] Field of Search .............................. 423/300

[56] References Cited

U.S. PATENT DOCUMENTS

| 2,925,320 | 2/1960 | Kahler | 423/300 |
| 2,975,028 | 3/1961 | Barth-Wehrenacp et al. | 423/300 |
| 4,377,558 | 3/1988 | De Jaeger et al. | 423/300 |
| 4,544,536 | 10/1985 | De Jaeger et al. | 423/300 |
| 4,693,876 | 9/1987 | De Jaeger et al. | 423/300 |

Primary Examiner—John Doll
Assistant Examiner—Wayne A. Langel
Attorney, Agent, or Firm—Burns, Doane, Swecker & Mathis

[57] ABSTRACT

Polychlorophosphazene $[Cl_2(O)P[NPCl_2]_nCl]$ is more rapidly produced by polycondensing N-(dichlorophosphoryl)-trichlorophosphazene $[P_2NOCl_5]$ in the presence of a catalytically effective amount of a tertiary amine.

9 Claims, 2 Drawing Sheets

PREPARATION OF POLYCHLOROPHOSPHAZENE

CROSS-REFERENCE TO COMPANION APPLICATIONS

Copending application, Ser. No. 166,368, filed concurrently herewith and assigned to the assignee hereof. Cf. copending applications, Ser. No. 119,195, filed Nov. 12, 1987, Ser. No. 166,367, and Ser. No. 166,270, the latter two also filed concurrently herewith and assigned to the assignee hereof.

BACKGROUND OF THE INVENTION

1. Field of the Invention

The present invention relates to the preparation of polychlorophosphazene from N-(dichlorophosphoryl)-trichlorophosphazene.

2. Description of the Prior Art

Linear polychlorophosphazenes having the following general formula are known to this art and have been described in published European application No. 0,026,685:

Also described in a process for the preparation of such polymers by the polycondensation of N-(dichlorophosphoryl)trichlorophosphazene, according to the following reaction scheme:

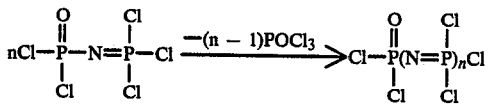

This polycondensation is carried out generally at an elevated temperature on the order of 200° to 350° C. Per the aforenoted application No. 0,026,685, the polycondensation reaction is advantageously carried out under agitation and in an atmosphere of an inert gas, such as anhydrous nitrogen, to promote the elimination of POCl$_3$ (page 7 of the noted application, lines 5 to 13).

SUMMARY OF THE INVENTION

A major object of the present invention is the provision of an improved process for the polycondensation of N-(dichlorophosphoryl)trichlorophosphazene, the velocity of which is markedly enhanced vis-a-vis the techniques to date characterizing the state of this art.

Briefly, the present invention features a process for the production of polychlorophosphazene by the polycondensation of N-(dichlorophosphoryl)trichlorophosphazene, wherein all or a part of the polycondensation reaction is carried out in the presence of a tertiary amine.

DETAILED DESCRIPTION OF THE PREFERRED EMBODIMENTS OF THE INVENTION

Figure 1:
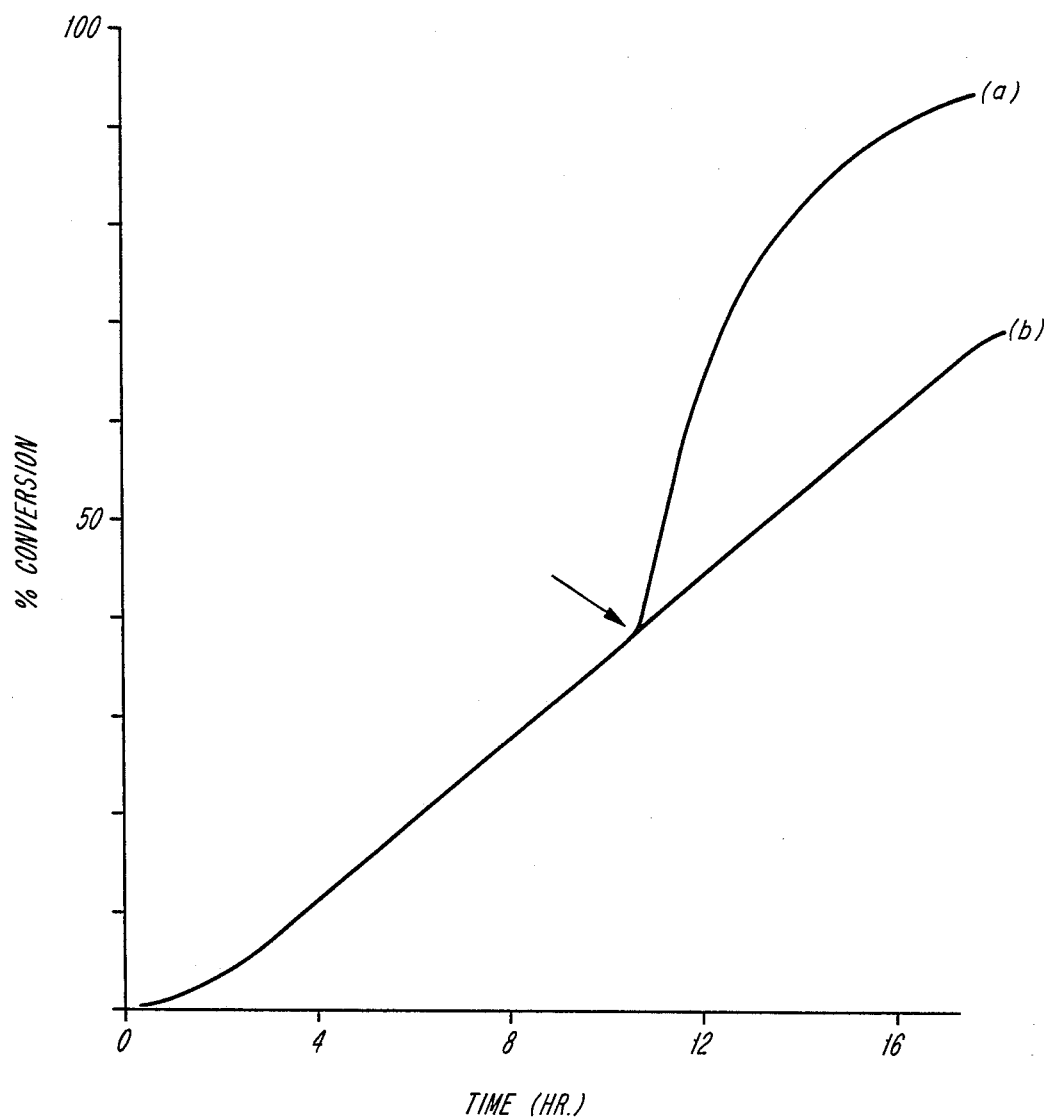
FIGS. 1 and 2 illustrate the degree of conversion when carrying out the process in the presence of a catalytically effective amount of a tertiary amine, as opposed to the absence of a tertiary amine.

More particularly according to the present invention, the tertiary amine is advantageously selected from among compounds which are stable at the reaction temperature and in the presence of the monomer and polymer. Consequently, if a controlled reaction is conducted, such as that described at pages 6 and 7 of the aforenoted application Ser. No. 0,026,685, an amine stable at 240° C. may be used only by introducing same after the temperature of the reaction medium has been reduced to this value, the reaction having been initiated at a temperature of from 280° to 350° C.

In light of the immediately aforesaid, the tertiary amine is typically selected from among compounds that are stable at a temperature of 200° C. and preferably at temperatures higher than 240° C.

By the concept of "stability" is intended both the absence of the destruction of the amine compound by decomposition, as well as the absence of any reaction of such compounds with any materials present in the reaction medium.

The tertiary amine is advantageously selected from among the aliphatic amines containing at least twelve carbon atoms and in particular 15 to 30 carbon atoms, mono- or polycyclic aromatic amines, the aromatic nuclei of which being optionally substituted with halogen atoms or alkyl radicals containing up to 3 carbon atoms, heterocyclic amines containing 1 or 2 nitrogen atoms and, optionally, other heteroatoms, such as O or S, and optionally substituted such heterocycles bearing at least one halogen atom or alkyl radical substituent containing up to 3 carbon atoms, aralkyl or aryl groups, or forming, together with one or more aromatic ring members, a condensed polycyclic system.

Exemplary of the tertiary amines suitable for use in the process of the invention, whether singly or in admixture, the following are representative:

(i) Tributylamine;
(ii) Triisopentylamine;
(iii) Tripentylamine;
(iv) Trihexylamine;
(v) Tris(2-methylbutyl)amine;
(vi) Triheptylamine;
(vii) Trioctylamine;
(viii) Tridecylamine;
(ix) Triphenylamine;
(x) N,N-Dimethyl-α-naphthylamine;
(xi) N,N-Dimethyl-β-naphthylamine;
(xii) 2,6-Dibromopyridine;
(xiii) 2-Phenyl, 3-phenyl and 4-phenylpyridines;
(xiv) 2,3,4-Trimethyl, 2,3,5-trimethyl, 2,3,6-trimethyl, 2,4,5-trimethyl and 2,4,6-trimethylpyridines;
(xv) 4-Butylmorpholine;
(xvi) 4-Benzylmorpholine;
(xvii) 4-Phenylmorpholine;
(xviii) Benzothiazole;
(xix) Phenanthridine;
(xx) 2,4-dichloro-5-methylpyrimidine.

Among these amines, the substituted pyridines, and in particular the trimethylpyridines, are the preferred.

In the process according to the invention, in general at least 0.1 molar % tertiary amine is used relative to the monomer subjected to polycondensation (P$_2$NOCl$_5$ in abbreviated formula). The maximum amount of the tertiary amine that may be used is dependent on the type of polymer that is to be produced. In effect, a large quantity of the tertiary amine, for example greater than 2 molar %, tends to cause crosslinking of the polymer and limits the polycondensation to the production of low molecular weight polymers. For this reason, and to obtain polymers having molecular weights sufficiently high as to permit the molding, extruding or shaping thereof, e.g., in the form of films, advantageously 0.2 to 1.5 molar % of the tertiary amine is used relative to the $P_2NOCl_5$ monomer employed in the polycondensation.

In the process according to the invention, the tertiary amine may be introduced into the polycondensation reactor simultaneously with the monomer to be polycondensed. It may also be introduced into the reaction medium containing a certain percentage of the polycondensate and, generally, the tertiary amine may be introduced in one or several portions, or progressively, while the proportion of the monomer converted into polymer ranges from 0% to approximately 75-80%.

The process of the invention may be carried out in solution, for example, in a chlorinated aromatic hydrocarbon, such as trichlorobenzene. As regards specific operating conditions, the general and preferred parameters are as set forth in EP No. 0,026,685, hereby expressly incorporated by reference. In particular, the conditions described in the application Ser. No. 0,026,685 relative to the duration of the reaction, temperature, pressure, the possibility of carrying out the reaction successively at different temperatures and/or at different pressures are here applicable. Likewise as regards the control of the polycondensation reaction and the purification of the polychlorophosphazene produced. It is known that the course of the polycondensation reaction is accompanied by release of $POCl_3$. Consequently, the rate of release of $POCl_3$ is proportional to the rate of growth of the macromolecular chains and the advantage of the process according to the invention is clearly demonstrated by measuring this rate of release of $POCl_3$ in the presence or absence of the tertiary amine, as will hereinafter be seen.

In order to further illustrate the present invention and the advantages thereof, the following specific examples are given, it being understood that same are intended only as illustrative and in nowise limitative.

EXAMPLE 1

Into an agitated reactor, maintained under a flow of nitrogen and equipped with a device enabling separation of the $POCl_3$ formed from the solvent at reflux, the following reagents were introduced: 102.52 g (0.380 mole) $P_2NOCl_5$ and 46.60 g of 1,2,4-trichlorobenzene.

The mixture was heated to the reflux temperature, or 210° C. The $P_2NOCl_5$ polycondensed into polychlorophosphazene and the $POCl_3$, a byproduct of the polycondensation, was collected at a rate that was essentially a linear function of time. This rate is expressed as the proportion converted per hour. It amounted to 4.04%/hr. At a degree of conversion of 39%, 0.46 g (0.0038 mole) of 2,4,6-trimethylpyridine was introduced into the reactor. An immediate acceleration of the conversion rate was observed, the value of which increased to 15.70%/hr between 40% and 65% (FIG. 1, curve (a), with the arrow marking the introduction of the 2,4,6-trimethylpyridine.

As a comparison, if the tertiary amine was not introduced at a degree of conversion of 39%, the flow rate of the $POCl_3$, expressed as the proportion of conversion, remained at 4.04%/hr, to 65% (FIG. 1, curve(b)).

EXAMPLE 2

The procedure of Example 1 was repeated, by introducing into the reactor 228.30 g (0.849 mole) $P_2NOCl_5$, 116.12 g of 1,2,4-trichlorobenzene and 1 molar % of 2,4,6-trimethylpyridine (relative to $P_2NOCl_5$).

Figure 2:
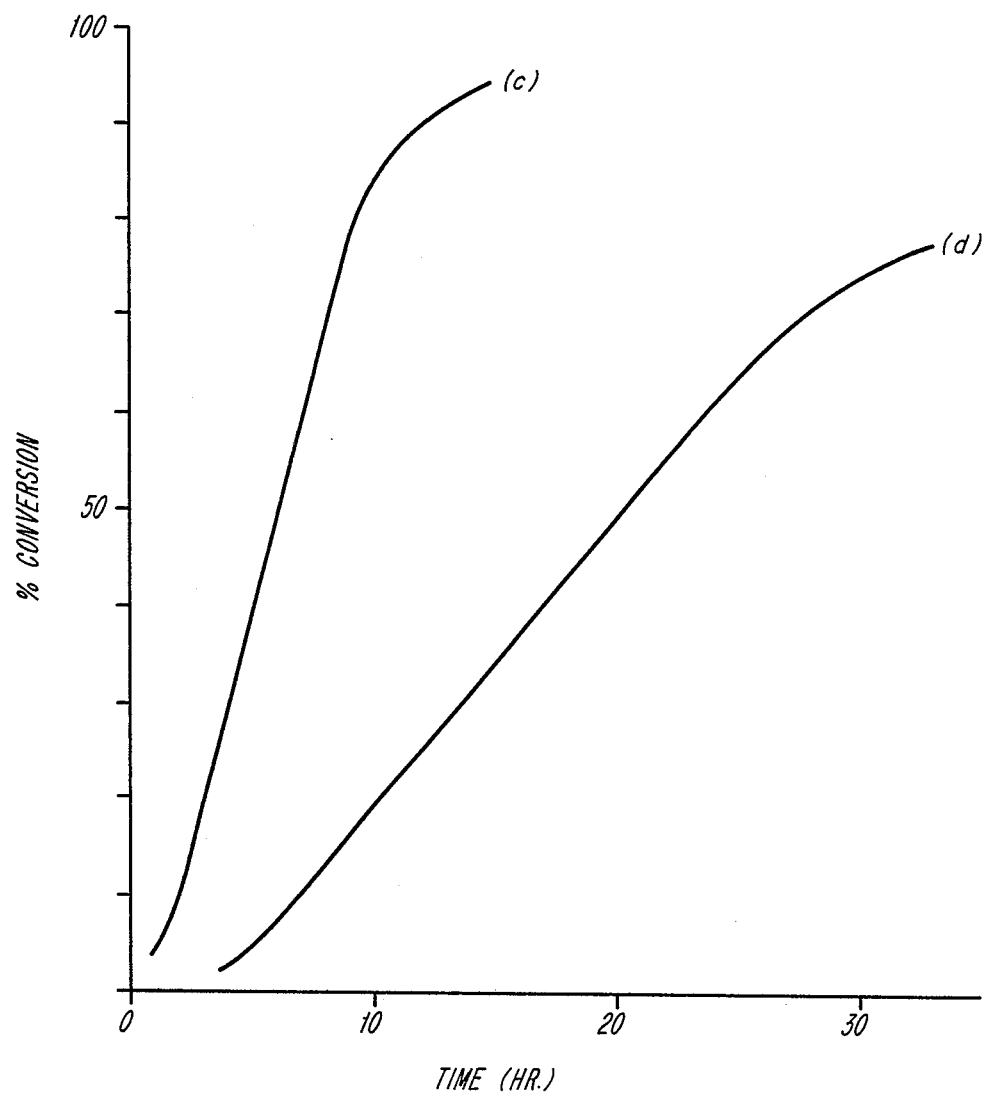

The linear section of the curve representing the quantity of $POCl_3$ collected as a function of time, measured from 20% to 70% of conversion and expressed as the proportion of conversion per hour, was 10.71%/hr (FIG. 2, curve (C)).

As a comparison, if this experiment was repeated without the introduction of the tertiary amine, the flow rate, expressed as the proportion of conversion per hour and measured from 10% to 60%, was 3.09%/hr (FIG. 2, curve (d)).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of polychlorophosphazene [$Cl_2(O)P[NPCl_2]_nCl$], comprising polycondensing N-(dichlorophosphoryl)trichlorophosphazene [$P_2NOCl_5$], at least a part of the polycondensation reaction being carried out in the presence of a catalytically effective amount of a tertiary amine.

2. The process as defined by claim 1, said teritary amine comprising an aliphatic amine containing at least twelve carbon atoms, a mono- or polycyclic aromatic amine, the aromatic nuclei of which being optionally substituted with halogen atoms or alkyl radicals containing up to 3 carbon atoms, heterocyclic amines containing 1 or 2 nitrogen atoms and, optionally, other heteroatoms, substituted such heterocycles bearing at least one halogen atom or alkyl radical substituent containing up to 3 carbon atoms, aralkyl or aryl groups, or forming, together with one or more aromatic ring members, a condensed polycyclic system.

3. The process as defined by claim 1, said tertiary amine comprising tributylamine; triisopentylamine; tripentylamine; trihexylamine; tris(2-methylbutyl)amine; triheptylamine; trioctylamine; tridecylamine; triphenylamine; N,N-dimethyl-α-naphthylamine; N,N-dimethyl-β-naphthylamine; 2,6-dibromopyridine; 2-phenyl, 3-phenyl and 4-phenylpyridines; 2,3,4-trimethyl, 2,3,5-trimethyl, 2,3,6-trimethyl, 2,4,5-trimethyl or 2,4,6-trimethylpyridine; 4-butylmorpholine; 4-benzylmorpholine; 4-phenylmorpholine; benzothiazole; phenanthridine; or 2,4-dichloro-5-methylpyrimidine.

4. The process as defined by claim 2, said tertiary amine comprising a substituted pyridine.

5. The process as defined by claim 1, said tertiary amine being stable at a temperature of 200° C.

6. The process as defined by claim 1, said tertiary amine being stable at a temperature of 240° C.

7. The process as defined by claim 1, carried out in the presence of from 0.2 to 1.5 mole % of the tertiary amine.

8. The process as defined by claim 1, carried out in an aromatic solvent medium.

9. The process as defined by claim 1, said tertiary amine comprising a trimethylpyridine.

* * * * *